US007176980B2

(12) United States Patent
Stone et al.

(10) Patent No.: US 7,176,980 B2
(45) Date of Patent: Feb. 13, 2007

(54) METHOD AND APPARATUS FOR VERIFYING A VIDEO FORMAT SUPPORTED BY A DISPLAY DEVICE

(75) Inventors: Christopher J. Stone, Newtown, PA (US); Robert Van Wagenen, Warrington, PA (US); William Hicklin, Chalfont, PA (US)

(73) Assignee: General Instrument Corporation, Horsham, PA (US)

( * ) Notice: Subject to any disclaimer, the term of this patent is extended or adjusted under 35 U.S.C. 154(b) by 487 days.

(21) Appl. No.: 10/806,581

(22) Filed: Mar. 23, 2004

(65) Prior Publication Data

US 2005/0212965 A1 Sep. 29, 2005

(51) Int. Cl.
*H04N 5/46* (2006.01)

(52) U.S. Cl. .................................................. 348/558
(58) Field of Classification Search ................ 348/558, 348/516, 554–557, 699, 448, 555, 540, 547
See application file for complete search history.

(56) References Cited

U.S. PATENT DOCUMENTS 5,953,074 A * 9/1999 Reddy ........................ 348/558
6,356,313 B1 * 3/2002 Champion et al. ........... 348/558
6,734,919 B2 * 5/2004 Champion et al. ........... 348/558
6,972,803 B2 * 12/2005 Seth-Smith et al. ......... 348/558

OTHER PUBLICATIONS

Digital Visual Interface, Rev. 1, published by the Digital Display Working Group (Apr. 1999).
Electronic Industries Alliance/Consumer Electronics Association standard entitled "EIA/CEA-861", Jan. 2001.

* cited by examiner

*Primary Examiner*—Paulos M. Natnael
(74) *Attorney, Agent, or Firm*—Benjamin D. Driscoll

(57) ABSTRACT

A method (200) for verifying a video format supported by a display device (25). The display device (25) is adapted to receive a television signal from a video source (10) via a video interface (15). The method includes: receiving (202) a data structure (75) provided by the display device (25), the data structure (75) specifying a plurality of timing parameters associated with a supported video format; providing (204) a plurality of predetermined value ranges, each of the plurality of predetermined value ranges corresponding to one of the plurality of timing parameters; separating (206) the data structure into a plurality of portions, each of the plurality of portions corresponding to one of the plurality of timing parameters; comparing (208) at least some of the plurality of portions with at least some of the plurality of predetermined value ranges; and based on the comparisons, determining whether the supported video format is verified.

23 Claims, 9 Drawing Sheets

METHOD AND APPARATUS FOR VERIFYING A VIDEO FORMAT SUPPORTED BY A DISPLAY DEVICE

FIELD OF THE INVENTION

Aspects of this invention relate generally to video signal processing, and, more particularly, to a method and apparatus for verifying a video format supported by a display device.

BACKGROUND OF THE INVENTION

Program providers such as television networks or stations, studios, Internet broadcasters or service providers, cable operators, satellite operators and the like, deliver video programming to consumers via digital signals. Devices and signals involved in the delivery of digital video programming to consumers may comply with various industry specifications, or standards, which have been promulgated by groups desiring, among other things, to ensure interoperability between systems and devices that deliver the digital video programming.

The Digital Display Working Group ("DDWG"), for example, has published a document entitled Digital Visual Interface, Revision 1.0 (hereinafter referred to as the "DDWG Specification"), which sets forth an industry standard for a physical digital visual interface ("DVT"), and a protocol for electrical signaling thereon, between a personal computing device and a display device. The DDWG Specification is hereby incorporated by reference in its entirety for all purposes, as if set forth in full herein. Likewise, the Electronic Industries Alliance ("EIA") and the Consumer Electronics Association ("CEA") have together promulgated a standard entitled "EIA/CEA-861," published in January, 2001 (hereinafter referred to as the "EIA/CEA-861 Standard"), which defines video timing requirements, discovery structures, and data transfer structures used for implementing digital interfaces on digital televisions or monitors. The EIA/CEA-861 Standard is also hereby incorporated by reference in its entirety for all purposes, as if set forth in full herein.

Both the DDWG Specification and the EIA/CEA-861 Standard address mandatory uses of a data structure known as the Video Electronics Standards Association's ("VESA") Extended Display Identification Data ("EDID") data structure (hereinafter referred to as the "EDID Data Structure," which is described in detail in a document published by VESA entitled "EDID Standard, Version 3, November, 1997, incorporated by reference in its entirety for all purposes, as if set forth in full herein). The EDID Data Structure is stored by display devices such as digital television displays and monitors, and defines, among other things, data formats and timings used to carry information, such as video programming, from source devices, such as cable or terrestrial set-top boxes, digital video cassette recorders ("VCRs"), computers, and digital video disk ("DVD") players, to the display devices, and further defines the display devices' capabilities to receive and render data in such data formats/timings.

Among other things, the DDWG Specification and the EIA/CEA-861 Standard require that source devices read the EDID Data Structure from display devices (the EDID Data Structure may be transmitted from display devices to source devices over physical links such as $I^2C$ buses, for example), to determine data format/timing capabilities supported by the display devices. Neither the DDWG Specification nor the EIA/CEA-861 Standard, however, currently mandates how source devices use information from the EDID Data Structure to select data formats/timings for sending video programming to display devices.

Customer dissatisfaction with the performance of either source devices or display devices is a danger when display devices present inaccurate EDID Data Structures—for example, the use of information obtained from reading inaccurate EDID Data Structures may result in the source devices sending video using data formats/timings not supported by, or optimal for, the display devices.

There is, therefore, a need for a method and apparatus for verifying a video format supported by a display device, which is able to provide a robust consumer experience even in the instance where the display device provides an inaccurate EDID Data Structure.

SUMMARY OF THE INVENTION

In accordance with one aspect of the present invention, a method for verifying a video format supported by a display device is provided. The display device is adapted to receive a digital television signal from a digital video source via a digital video interface. The method includes: receiving a data structure provided by the display device, the data structure specifying a plurality of timing parameters associated with a supported video format; providing a plurality of predetermined value ranges, each of the plurality of predetermined value ranges corresponding to one of the plurality of timing parameters; separating the received data structure into a plurality of portions, each of the plurality of portions corresponding to one of the plurality of timing parameters; comparing at least some of the plurality of portions with at least some of the plurality of predetermined value ranges; and based on the comparisons, determining whether the supported video format is verified.

In accordance with another aspect of the present invention, a computer-readable medium is encoded with a computer program which, when executed, implements the foregoing method. The method may further include including the supported video format in a schedule of supported video formats associated with the display device, based on whether the supported video format is verified—if the supported video format is not verified, the supported video format is not included on the schedule; if it is verified, it is included on the schedule. A picture aspect ratio of the verified, supported video format may also be determined. A user of the display device may select a preferred video format, from a menu, and based on the user's selection, the digital video interface transmits the digital television signal to the display device in the selected format.

In accordance with a further aspect of the present invention, an apparatus for verifying a video format supported by a display device includes a computer-readable storage medium, and a processor responsive to the computer-readable storage medium and to a software program. The software program, when loaded into the processor, is operative to perform a method including: receiving a data structure specifying a plurality of timing parameters associated with a supported video format of the display device; accessing a plurality of predetermined value ranges, each of the plurality of predetermined value ranges corresponding to one of the plurality of timing parameters; separating the received data structure into a plurality of portions, each of the plurality of portions corresponding to one of the plurality of timing parameters; comparing at least some of the plurality of portions with at least some of the plurality of predetermined value ranges; and based on the comparisons, determining whether the supported video format is verified. The processor may be associated with the display device, a set-top box adapted to transmit a video signal to the display device, or a digital video interface responsive to the display device.

DETAILED DESCRIPTION OF THE INVENTION

Figure 1:
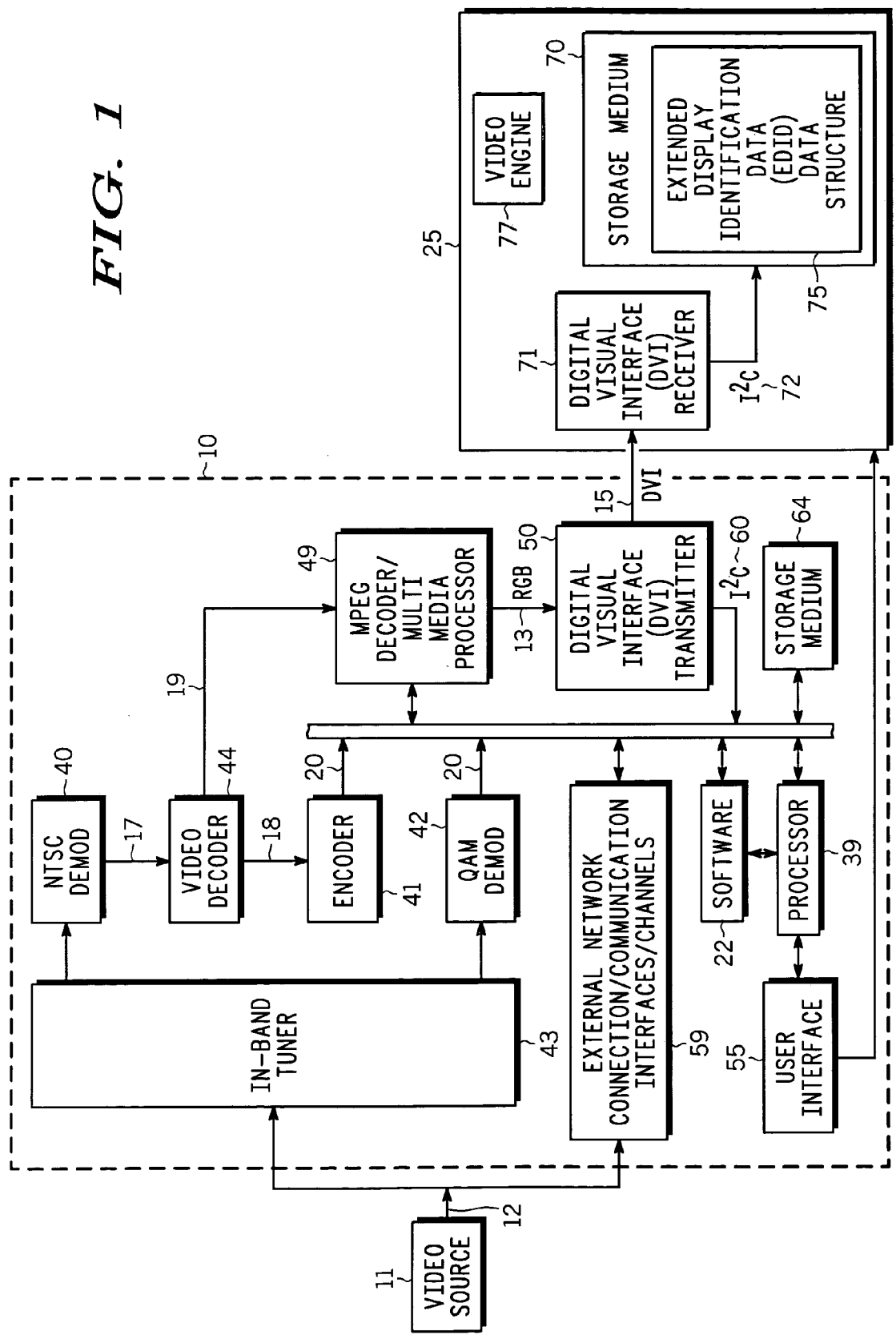
FIG. 1 is a block diagram of a video signal handling system, in accordance with various aspects of the present invention.

Turning now to the drawings, where like numerals designate like components, FIG. 1 is a block diagram of a video signal handling system 10 ("system 10"), which serves as a digital video source for the delivery of a digital video signal 13 to a display device 25, over a digital interface 15.

System 10 receives video signal 12 from video source 11. As shown, system 10 is a cable set-top box (for example, Motorola's DCT-5100™ set-top box), video source 11 is a hybrid fiber-optic/coax cable network operated by a cable television operator, video signal 12 is a digital programming source supplied by the cable operator, video signal 13 is a digital video signal (e.g. component RGB (Red-Green-Blue) representation of the original signal), digital interface 15 is a Digital Visual Interface ("DVI") defined by the DDWG Specification, and display device 25 is a digital television monitor.

System 10, however, may be any device or combination of devices capable of receiving and/or rendering video signal 12 to display device 25, including but not limited to a digital video cassette recorder ("VCR"), a digital video disk ("DVD") player, a computer, or any other consumer appliance responsive to a digital video interface transmitter device; video source 11 may be any public or private, wired or wireless, video transmission infrastructure or technology, including but not limited to a fiber-optic network, a coaxial cable network, a hybrid network, a satellite network, cellular network, the Internet, a television network, a radio network, a copper wire network, or any other existing or future transmission infrastructure or technology, operated by any type of program provider, such as a television network or station, a studio, an Internet broadcaster or service provider, a cable operator, or a satellite operator; video signal 12 may be any pre-recorded or live analog or digital electronic signal representing an image and/or audio, in any format; video signal 13 may be a digital video signal destined for any type of display device; digital interface 15 may be any wired or wireless digital visual interface that transmits the EDID Data Structure, and display device 25 may be any digital display device, including but not limited to a computer screen, such as a CRT, a liquid crystal display, or a plasma display.

System 10 includes external network connection/communication interfaces 59, which support devices such as modems, streaming media players and other network connection support devices and/or software, coupled through local or wide area networks (not shown) to program providers and providers of other content.

System 10 further includes an in-band tuner 43, which tunes to a channel signal selected by a consumer (not shown) via user interface 55. User interface 55 is also used to provide requested inputs to system 10, such as display format preferences (discussed further below) for display device 25. User interface 55 may be any type of known or future device or technology allowing the consumer to select video formats, channels or programs the consumer wishes to receive, such as a remote control, mouse, microphone, keyboard, or display.

NTSC Demodulator 40 and QAM Demodulator 42 are responsive to in-band tuner 43. QAM Demodulator 42 may be any type of digital demodulator device that may include but is not limited to ATSC demodulation. NTSC Demodulator 40 includes components responsive to receive analog versions of a channel signal. QAM Demodulator 42 includes components responsive to receive digital versions of a channel signal. A QAM demodulator 42 component receives digital data packets from one or more digital sources, such as a digital television signal, a Moving Pictures Experts' Group (MPEG) transport stream, or a media stream from an external network connection 59, such as a cable modem, using well-known methods and techniques. An analog demodulator component 40 receives an analog version of a channel signal, and decodes signals and markers according to well-known methods and techniques. Demodulator 40 is operative to output video information 17, which includes video or audio data arranged for formatting in accordance with a predetermined media format.

Video decoder 44 is responsive to video information 17. Video decoder 44 is operative for decoding video information 17 and converting it into a digital representation of the received video information, which is output as digital video information 18 and 19.

Digital video information 18 and 19 are preferably arranged in accordance with Consultative Committee International Radio (CCIR) 656, which is video transmission standard well-known to those familiar with the art. Video information 18 that may require format translation or modification for compatibility with capabilities of the storage medium 64 may be passed to encoder 41 for formatting.

Video information 19 that is in a format preferred for use by the Multi Media Processor 49 may be passed directly to the Multi Media Processor 49.

Multi-Media Processor 49 is operative to perform predetermined coding techniques to arrange video information 19 and video information 20 into formats displayable by display device 25. Analog video programs are preferably passed to the Multi Media Processor 49 via video information 19 and digital video programs are preferably passed to the Multi Media Processor 49 via video information 20, which originated from the QAM demodulator 42. Video information that is retrieved and played back from the Storage Medium 64 is passed to the Multi Media Processor 49 via video information 20.

Encoder 41 is operative to perform predetermined coding techniques to produce encoded video signal 20 for transmission thereto, or for storage in storage medium 64.

Storage medium 64 is responsive to receive, among other things, encoded video signal 20 for storage, and to receive and store an EDID Data Structure 75 (discussed further below) from display device 25. Storage medium 64 may be any local or remote device, now known or later developed, capable of recording data, including but not limited to a hard disk drive, a videocassette recorder tape, all types of compact disks and digital videodisks, a magnetic tape, a home router, or a server.

MPEG Decoder/Multi-Media Processor 49 is responsive to receive and decode video signal 19 and video signal 20, format received video into its Red-Green-Blue (RGB) components and to transmit to display device 25, via Digital Visual Interface transmitter 50, in response to instructions from user interface 55. Internal arrangements of decoder 49 are well known—decoder 49 may include analog-to-digital converters, one or more storage media and/or buffers, and general or special-purpose processors or application-specific integrated circuits, along with demultiplexors for demultiplexing and/or synchronizing at least two transport streams, for example, video and audio. Video and audio decoders and/or analog and digital decoders may be separate, with communication between separate decoders allowing for synchronization, error correction and control.

Digital Visual Interface ("DVT") transmitter 50 has a physical and logical architecture as set forth in the DDWG Specification, and may be part of, or separate from, system 10. DVI transmitter may also be incorporated into the MPEG Decoder/Multi Media Processor 49. In operation, DVI transmitter 50 is responsive, via $I^2C$ bus 60, to access functions of system 10, such as storage medium 64, processor 39 (discussed further below) and software 22 (also discussed further below), and is responsive to display device 25 via digital interface 15. Among other things, DVI transmitter 50 arranges for the receipt of EDID Data Structure 75 from display device 25 via $I^2C$ bus 72 and digital interface 15, and, based on verification of video formats supported by display device 25 in accordance with aspects of the present invention (discussed further below), coordinates transmission of digital signal 13 over DVI interface 15, in a format compatible with video formats supported and displayable by display device 25.

Display device 25, which may also include speakers for outputting audio signals, displays digital video programming received from system 10 via digital video signal 13 over digital interface 15. Display device 25 may support one or more digital television formats set forth in the EIA/CEA-861-B Standard, for countries using 60 Hz systems, including two HDTV formats (1920×1080i and 1280×720p), one EDTV format (720×480p), and one standard definition format (720×480i). Picture aspect ratios of 16:9 and 4:3 are also specified. It will be appreciated that other specifications or standards may specify different or additional waveform timing parameters/formats, and the digital television formats parameters/formats referred to herein are set forth for purposes of example, and not limitation.

Functional arrangements of certain components of display device 25 are depicted—DVI transmitter 71, $I^2C$ bus 60, storage medium 70, and video engine 77—that pertain to the delivery of EDID Data Structure 75 to DVI transmitter 50, and ultimately to other functional elements of system 10, such as storage medium 64 and processor 39, via $I^2C$ bus 72 and $I^2C$ bus 60. DVI receiver 71 has a physical and logical architecture as set forth in the DDWG Specification, and is responsive to DVI transmitter 50 over digital interface 15, to storage medium 70 via $I^2C$ bus 72, and to video engine 77, which represents a processor, computer programs and/or physical components operative to implement the functions of display device 25 relating to display of pictures based on RGB video signal 13.

As mandated by the DDWG Specification or the EIA/CEA-861 Standard, or other specifications or standards, if applicable, in response to a request from system 10, display device 25 transmits EDID Data Structure 75 to system 10. EDID Data Structure 75 may be transmitted via $I^2C$ bus 72 and/or $I^2C$ bus 60, for storage by storage medium 64. The request may result from an event such as hot-plug connection/detection of display device 25 and system 10 (a feature set forth in the DDWG Specification), or in response to another suitable predetermined trigger, such as an event or a message.

In principle, the transmitted EDID Data Structure must set forth, among other things, waveform timing parameters for each video format supported by display device 25 that may be used to carry video signal 13 from system 10. The waveform timing parameters are to be provided in 18-byte detailed timing descriptors in predetermined portions of the EDID Data Structure. Each timing parameter is generally one predetermined block of bytes of the EDID Data Structure, and expressed in hexadecimal format. Examples of timing parameters for particular formats include, but are not limited to: the number of horizontal active pixels per line; the number of horizontal blanking pixels per line; the number of vertical active lines; the number of vertical blanking lines; the horizontal synchronization timing offset; the horizontal synchronization pulse width; the vertical synchronization timing offset; the horizontal image size; and the vertical image size.

Processor 39 and software 22 are illustrated functionally, and are responsive to various elements of system 10, including demodulator 40 and 42, encoder 41, storage medium 64, decoder 49, and DVI transmitter 50. When loaded into a processor, such as processor 39, software 22 is operative to control verification of video formats and timings supported by display device 25, by accessing and analyzing EDID Data Structure 75 in accordance with aspects of the present invention (discussed further below). It will be appreciated, however, that aspects of the present invention are not limited to any specific embodiments of computer software or signal processing methods. For example, one or more processors packaged together or with other elements of system 10 may implement functions of processor 39 in a variety of ways. It will also be appreciated that software 22 may be any stored instructions, in one or more parts (stored, for example, on storage medium 64, or another internal or external storage medium such as a read-only-memory or a random-access memory) electronically controlling functions provided by system 10, including firmware, and may be used or implemented by one or more elements, including one or more processors, of system 10.

Figure 2:
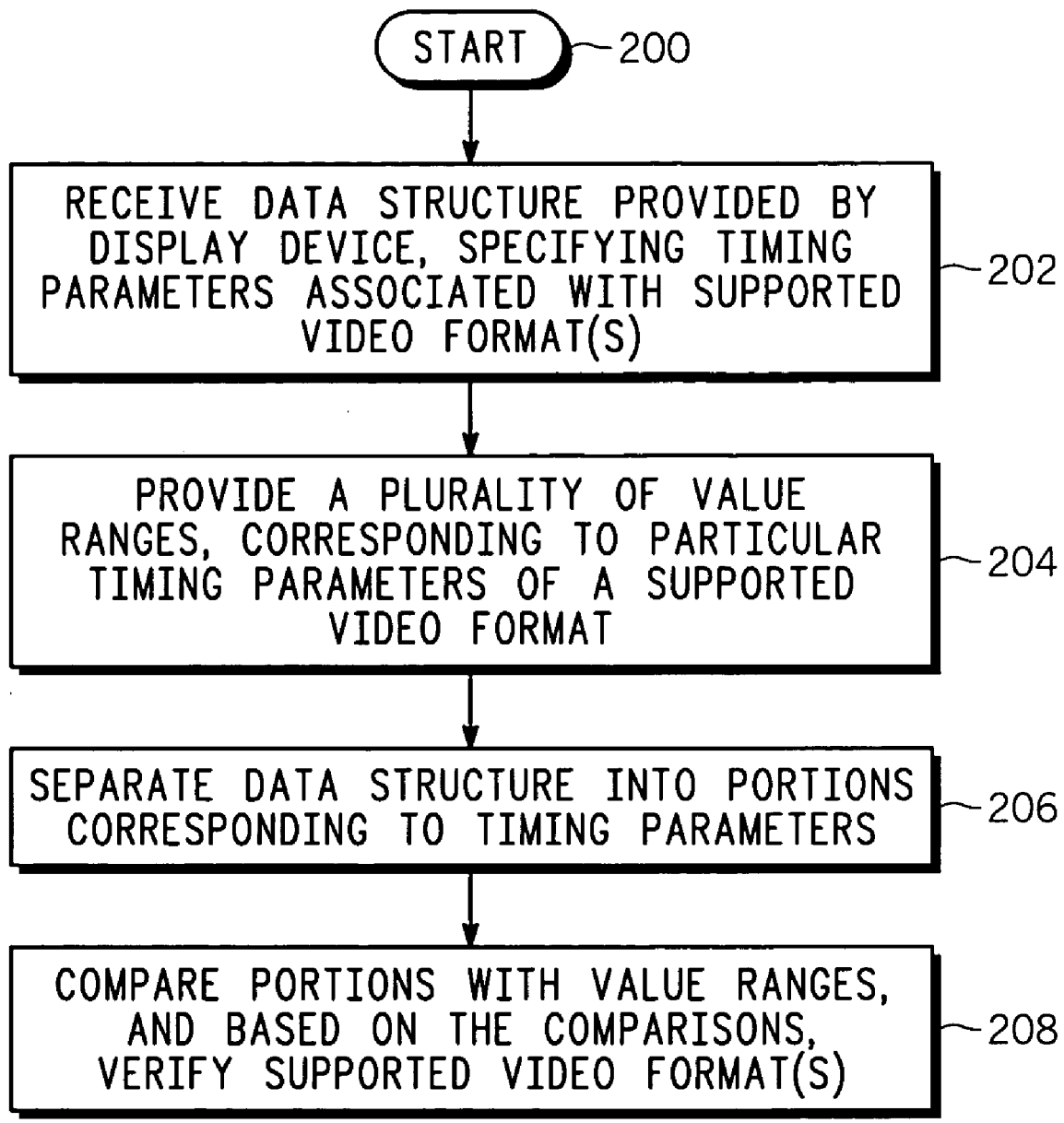
FIG. 2 is a flowchart of a method for verifying a video format supported by a display device, in accordance with an aspect of the present invention.
Figure 3:
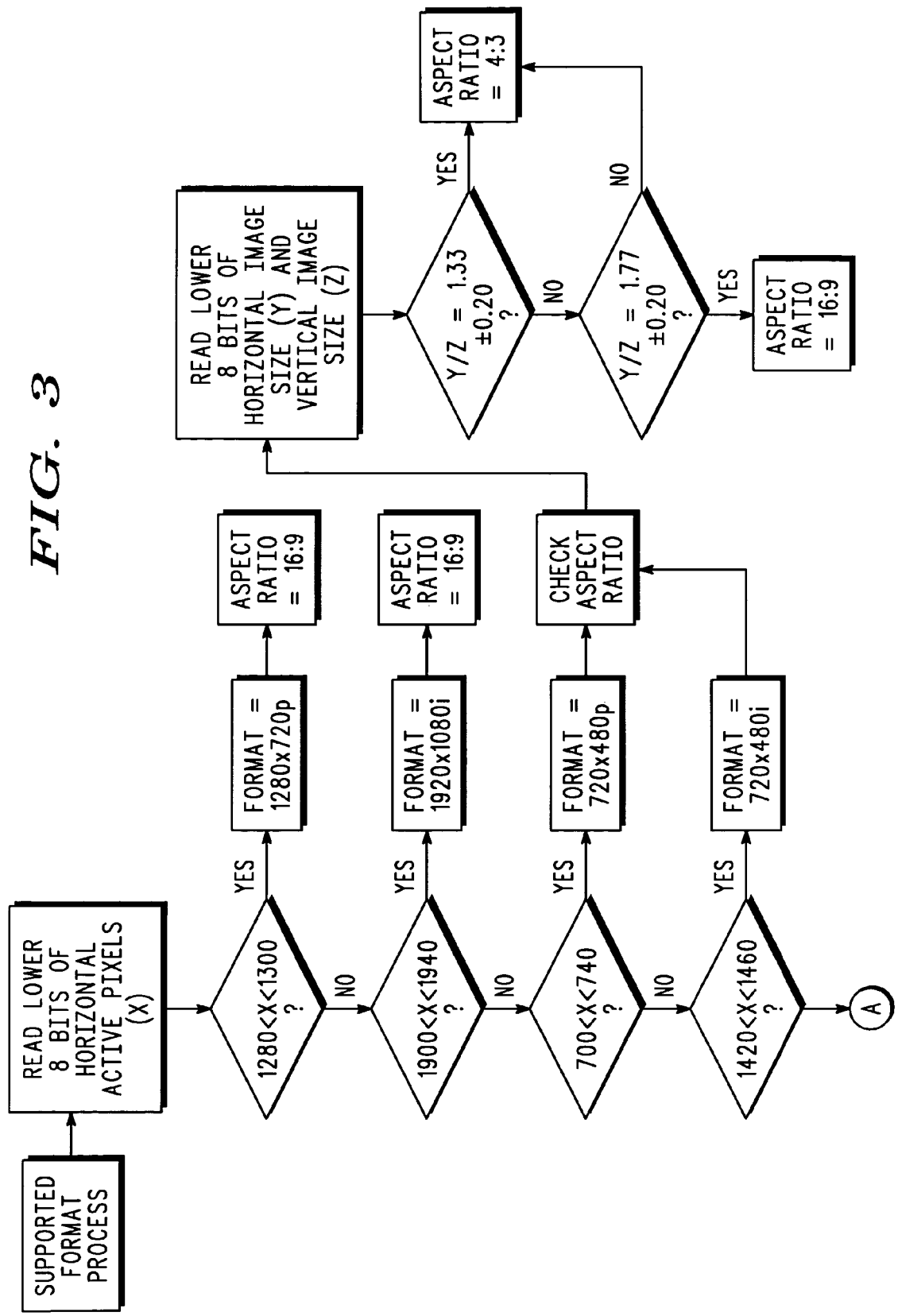
FIG. 3 is a flowchart of a process for identifying a particular video format associated with a timing parameter, provided by a display device, representing the number of horizontal active pixels per line.
Figure 4:
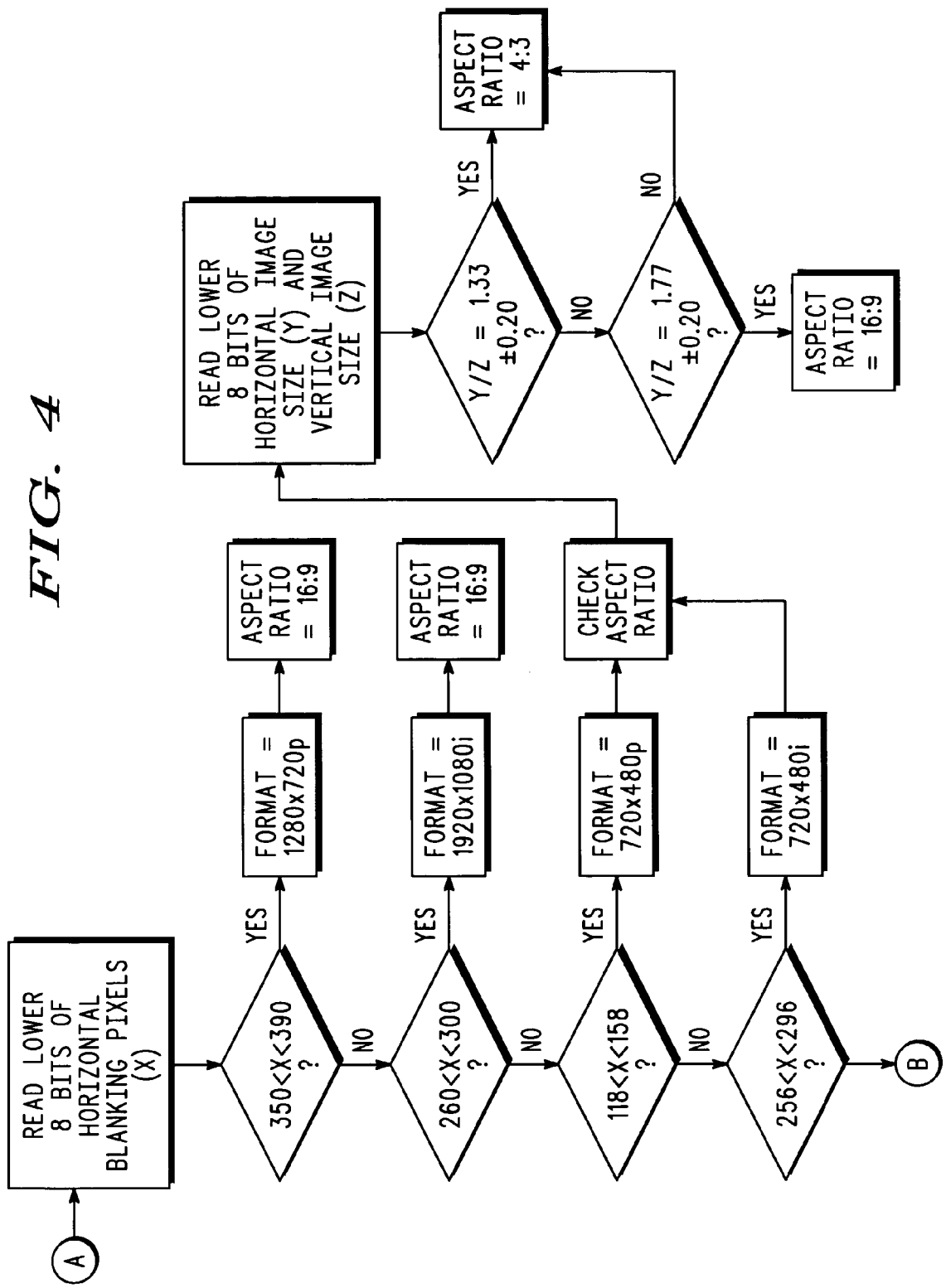
FIG. 4 is a flowchart of a process for identifying a particular video format associated with a timing parameter, provided by a display device, representing the number of horizontal blanking pixels per line.
Figure 5:
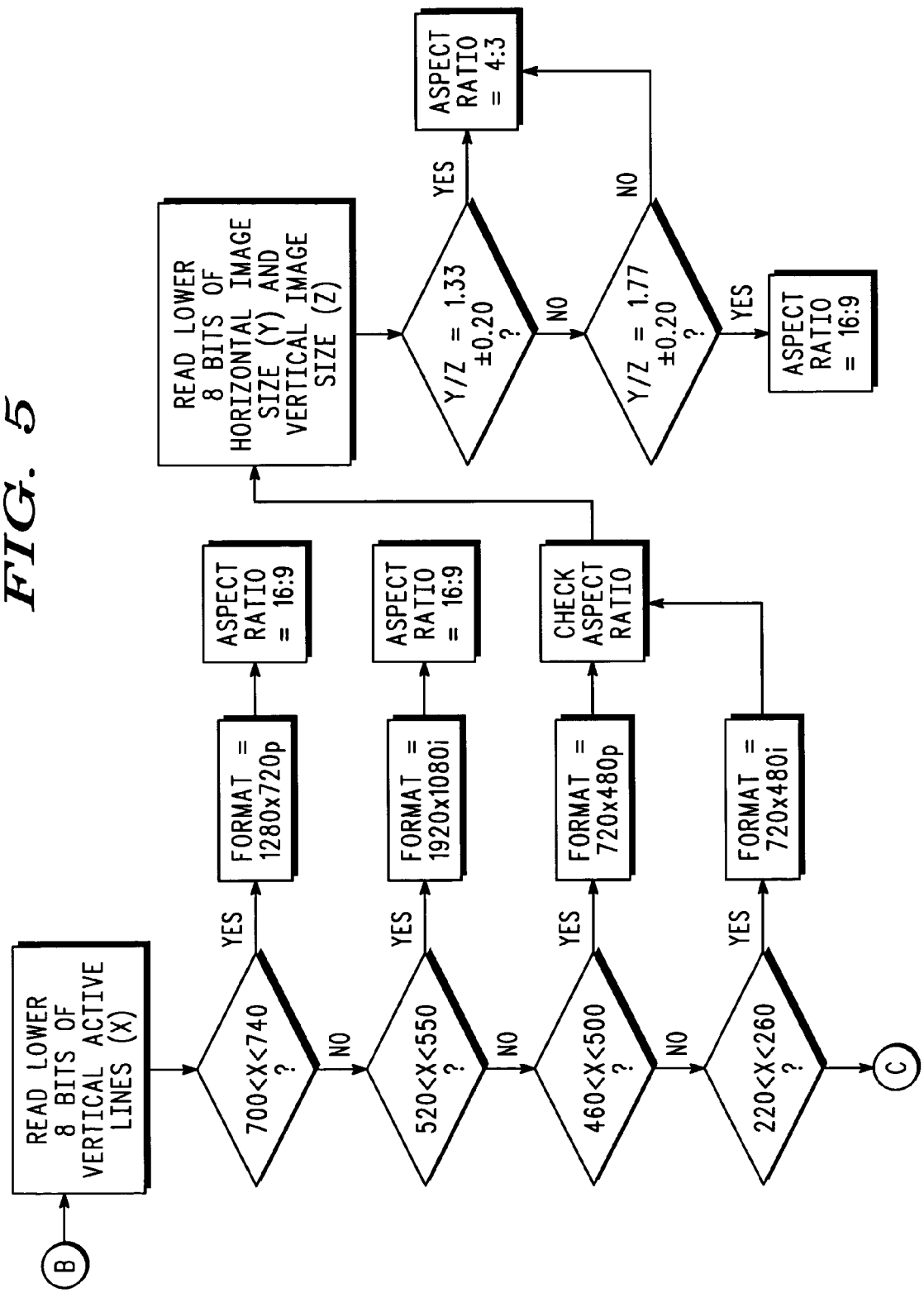
FIG. 5 is a flowchart of a process for identifying a particular video format associated with a timing parameter, provided by a display device, representing the number of vertical active lines.
Figure 6:
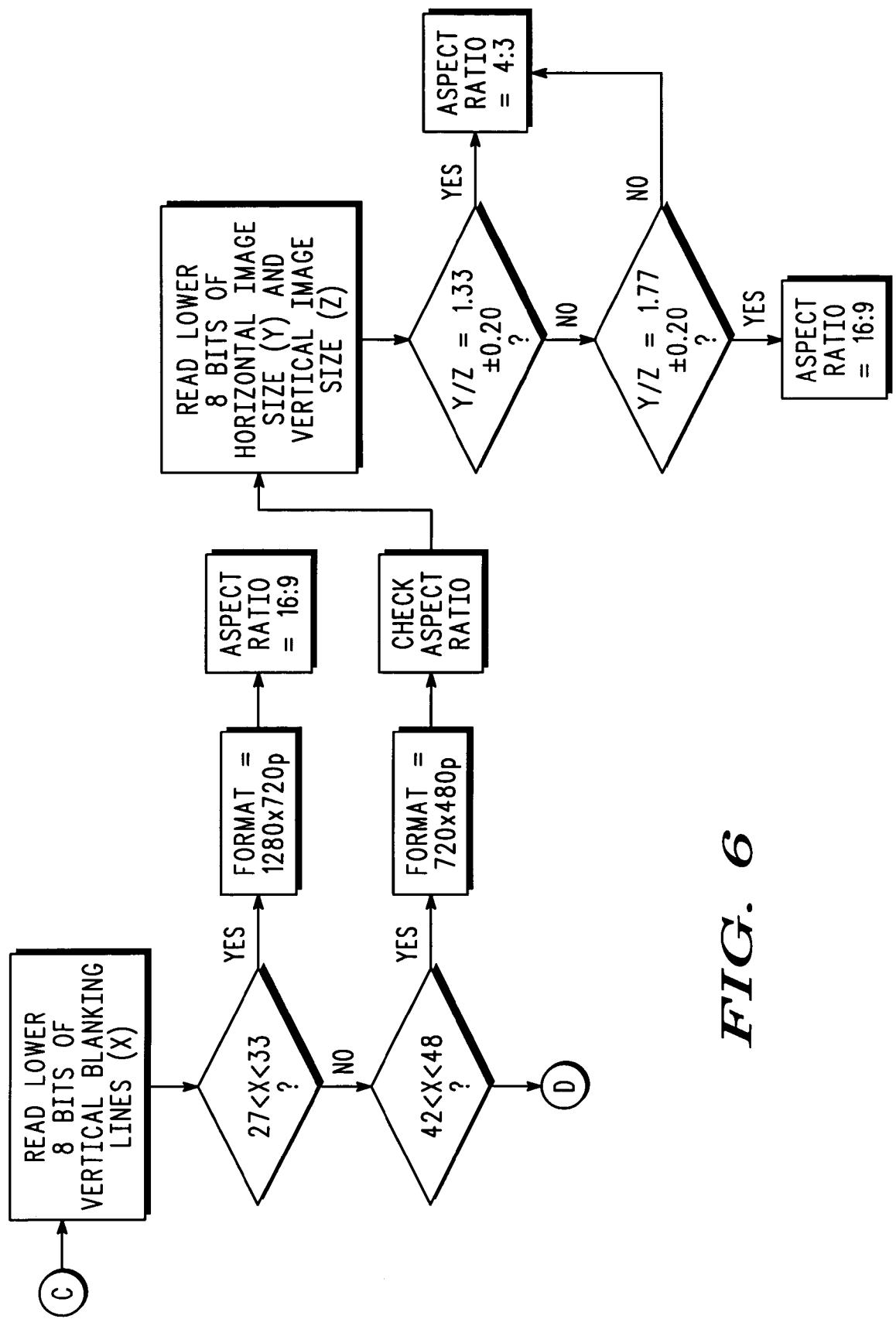
FIG. 6 is a flowchart of a process for identifying a particular video format associated with a timing parameter, provided by a display device, representing the number of vertical blanking lines.
Figure 7:
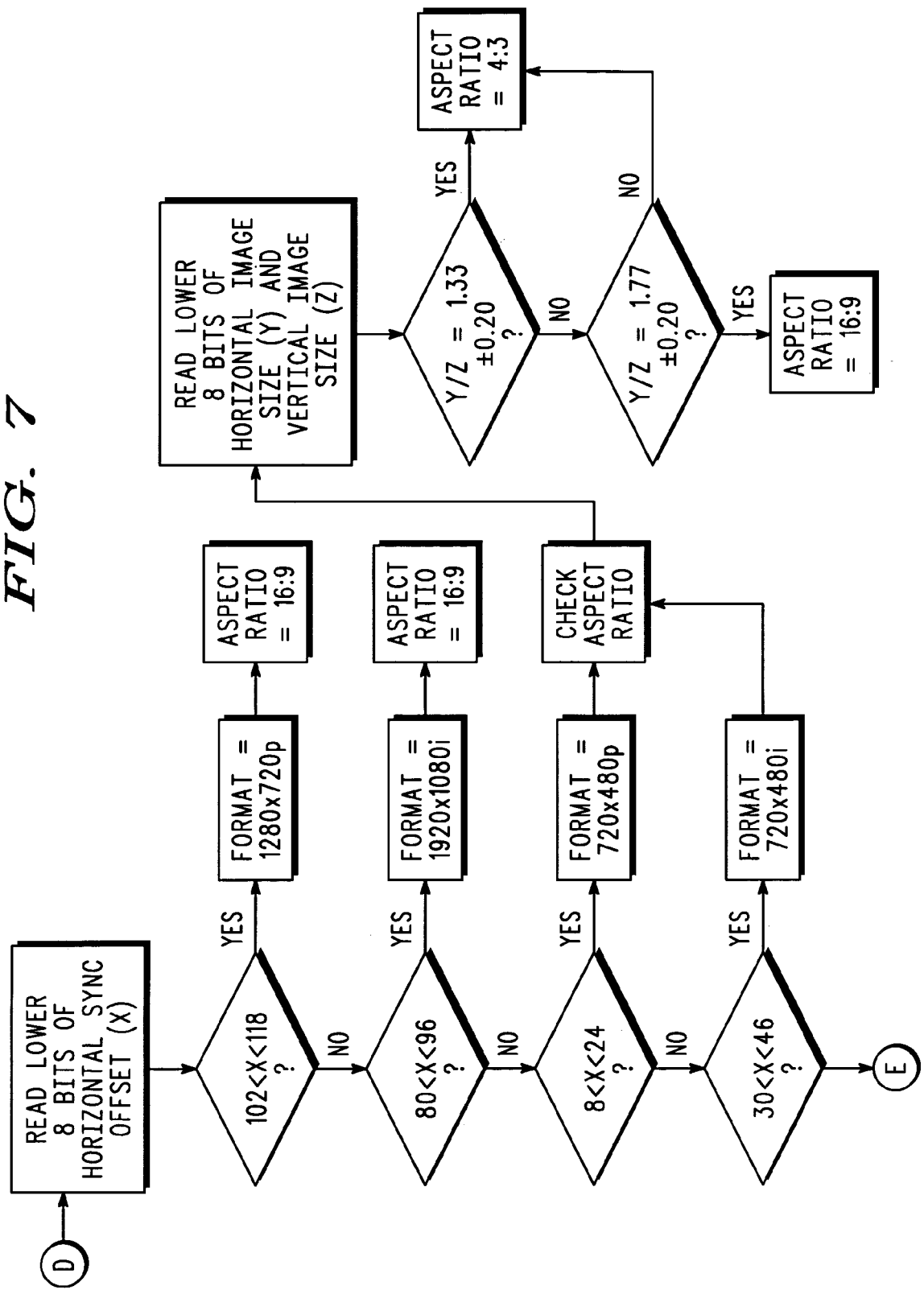
FIG. 7 is a flowchart of a process for identifying a particular video format associated with a timing parameter, provided by a display device, representing the horizontal synchronization timing offset.
Figure 8:
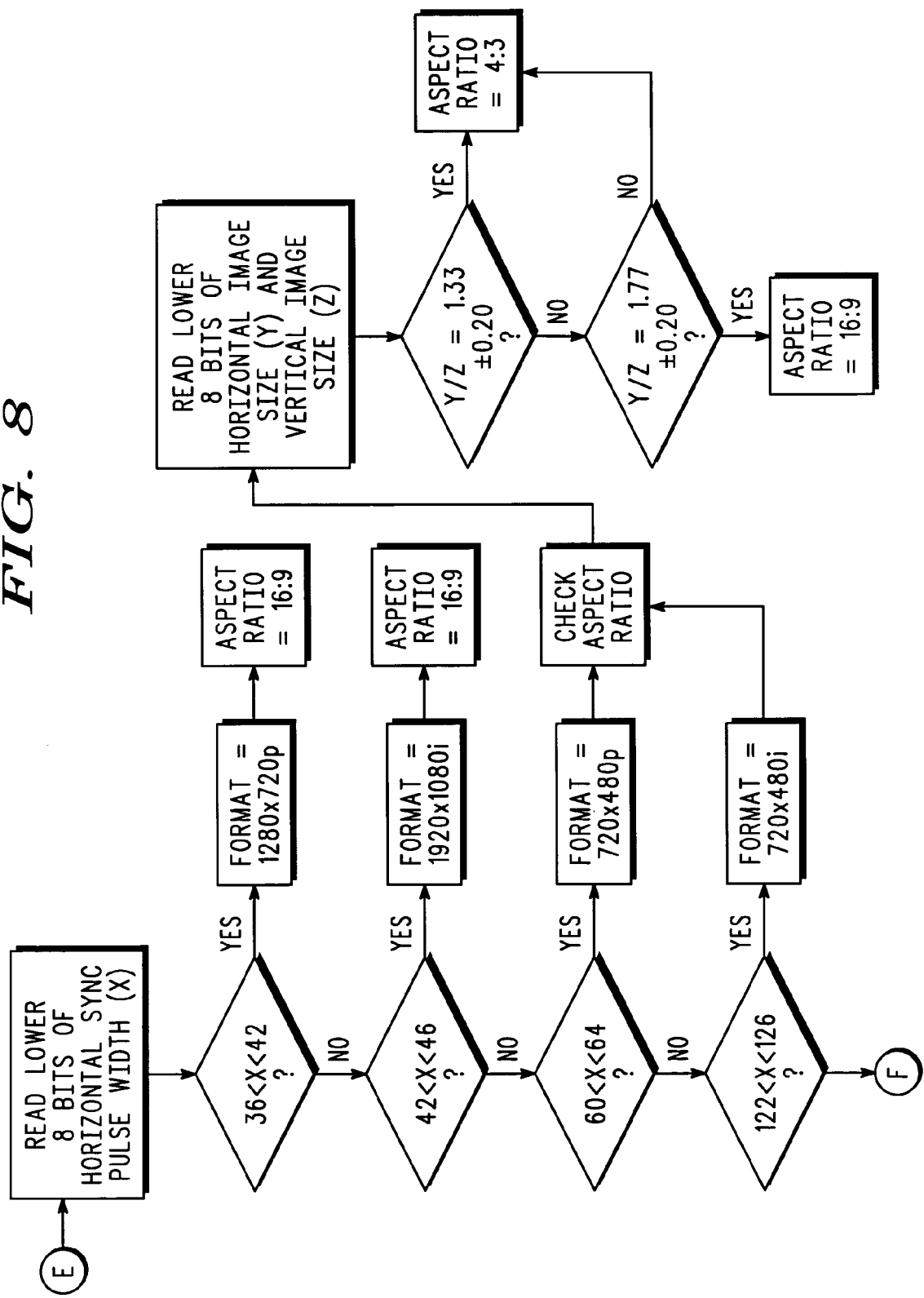
FIG. 8 is a flowchart of a process for identifying a particular video format associated with a timing parameter, provided by a display device, representing the horizontal synchronization pulse width.
Figure 9:
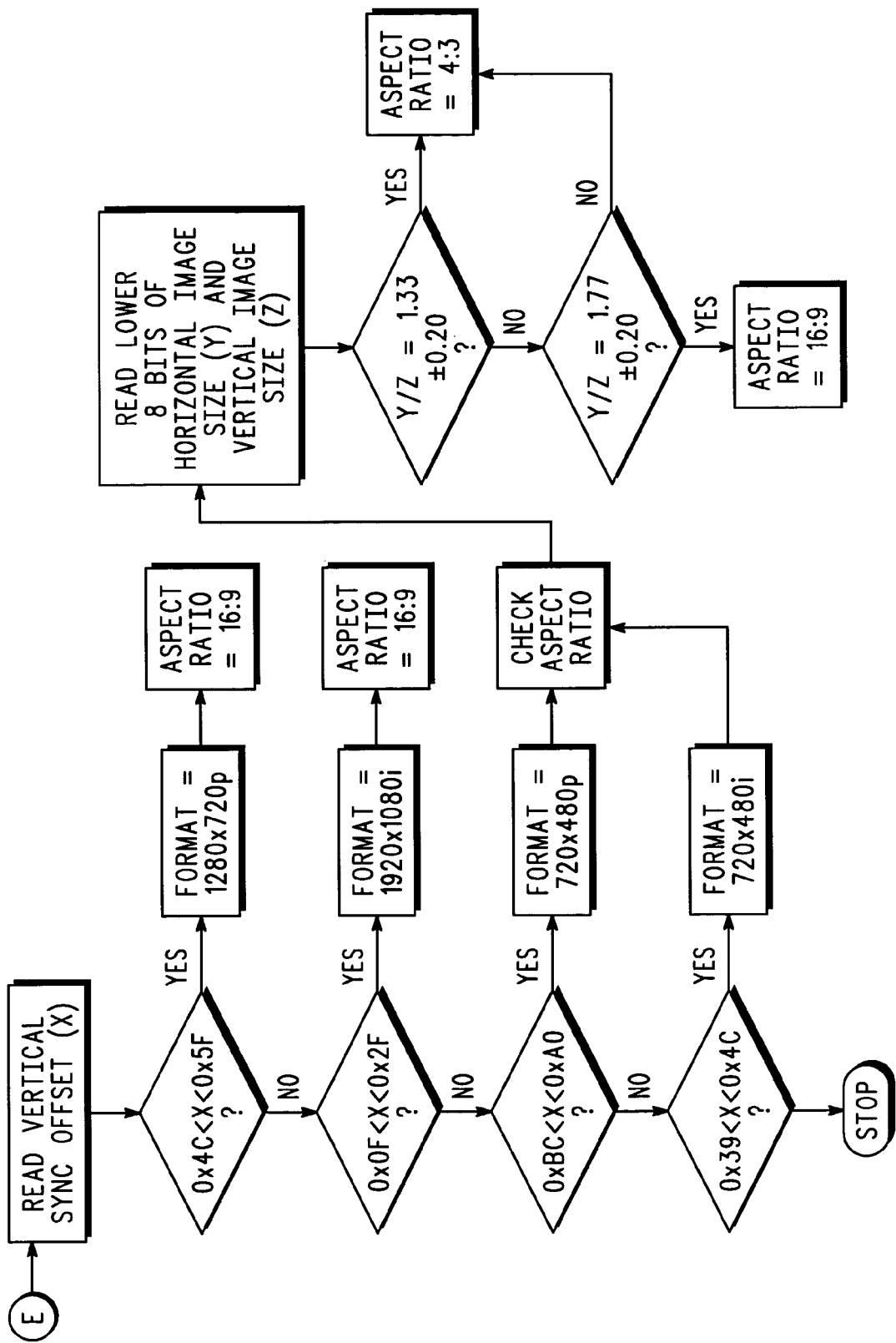
FIG. 9 is a flowchart of a process for identifying a particular video format associated with a timing parameter, provided by a display device, representing the vertical synchronization timing offset.

During normal operation of system 10, a consumer using user interface 55 selects digital video programming for viewing on display device 25. FIG. 2 is a flowchart of a method for verifying one or more video formats supported by a display device, such as display device 25, which is adapted to receive digital television signals, such as digital video signals 13, from a digital video source, such as source 11, via a digital video interface, such as digital interface 15, in accordance with aspects of the present invention. Examples of digital television formats that may be supported by display device 25 include two HDTV formats (1920×1080i and 1280×720p), one EDTV format (720×480p), and one standard definition format (720×480i). One or more supported picture aspect ratios of 16:9 and 4:3 are also possible.

The method begins at block 200, and continues at block 202, where a data structure, such as EDID Data Structure 75, is received. The data structure is provided by the display device, and specifies timing parameters associated with the one or more video formats supported by the display device. When display device 25 is initially coupled to system 10 via digital interface 15, EDID Data Structure 75 may be automatically sent to system 10—a system-level function such as hot-plug detection, for example, may be used to trigger automatic transmission of EDID Data Structure 75 from display device 25 to system 10. The data structure may be stored in a memory, such as storage medium 64.

Examples of timing parameters for a particular format include, but are not limited to: the number of horizontal active pixels per line ("HAP"); the number of horizontal blanking pixels per line ("HBP"); the number of vertical active lines ("VAL"); the number of vertical blanking lines ("VBL"); the horizontal synchronization timing offset ("H-SYNC"); the horizontal synchronization pulse width ("H-PULSE"); the vertical synchronization timing offset ("V-SYNC"); the horizontal image size ("H-SIZE"); and the vertical image size ("V-SIZE"). In addition, one or more aspect ratios ("AR") of 16:9 and 4:3 are possible for certain formats. Each timing parameter may be expressed in the data structure as one byte in hexadecimal format. At block 204, a plurality of predetermined value ranges, each value range corresponding to a particular timing parameter of a particular format, is provided. The value ranges may be stored, for example, in a memory, such as storage medium 64. The predetermined value ranges may represent, for example, typical ranges of decimal representations of the lower eight bits of particular timing parameter values that would be expected values for a given video format. Such typical, or expected, ranges may be obtained by observing actual transmitted timing values for different formats, or established in another suitable manner, such as approximation based on expected values and minimum/maximum differences between corresponding timing formats. Table 1 provides examples of predetermined value ranges corresponding to exemplary formats and timing parameters.

TABLE 1

| | Predetermined Value Ranges | | | |
| --- | --- | --- | --- | --- |
| | 1920 × 1080i | 1280 × 720p | 720 × 480p | 720 × 480i |
| HAP | 1900–1940 | 1280–1300 | 700–740 | 1420–1460 |
| HBP | 260–300 | 350–390 | 118–158 | 256–296 |
| VAL | 520–550 | 700–740 | 460–500 | 220–260 |

TABLE 1-continued

| | Predetermined Value Ranges | | | |
| --- | --- | --- | --- | --- |
| | 1920 × 1080i | 1280 × 720p | 720 × 480p | 720 × 480i |
| VBL | (same as 720 × 480i format; not determinative) | 27–33 | 42–48 | (same as 720 × 480i format; not determinative) |
| H-SYNC | 80–96 | 102–118 | 8–24 | 30–46 |
| H-PULSE | 42–46 | 38–42 | 60–64 | 122–126 |
| V-SYNC | | | | |
| H-SIZE/ V-SIZE, 4:3 AR | N/A | N/A | 1.33 +/− 0.20 | 1.33 +/− 0.20 |
| H-SIZE/ V-SIZE, 16:9 AR | Assume 16:9 | Assume 16:9 | 1.77 +/− 0.20 | 1.77 +/− 0.20 |

The received data structure is separated, at block 206, into a number of portions. Each of the portions corresponds to a timing parameter for a particular format. The portions may be, for example, timing parameters set forth in 18-byte detailed timing descriptors in predetermined portions of the EDID Data Structure.

At block 208, at least some of the portions are compared with at least some of the predetermined value ranges, and it is verified, based on the comparisons, whether the display device supports one or more video formats. FIGS. 3–9 are flowcharts illustrating an exemplary process for verifying whether a display device supports the video formats set forth in Table 1, using, for comparisons, the timing parameters (parsed from EDID Data Structure 75) of HAP (shown in FIG. 2), HBP (shown in FIG. 3), VAL (shown in FIG. 4), VBL (shown in FIG. 5), H-SYNC (shown in FIG. 6), H-PULSE (shown in FIG. 7), V-SYNC (shown in FIG. 9), and Aspect Ratio (which is calculated as the ratio of H-SIZE-to-V-SIZE, and corresponding value ranges for the lower eight bits of the applicable timing parameters. For each timing format set forth in EDID Data Structure 75, the selected timing parameters are compared to the predetermined value ranges.

If, after reading and processing EDID Data Structure 75 as shown in the examples of FIGS. 3–9, the EDID Data Structure indicates one or more verifiable supported video formats, then the verified video formats may be included on a schedule, such as a format menu, that allows the user, via user interface 55, to manually select the video format that he prefers to use with display device 25. Based on the user's selection of a preferred video format from the format menu, system 10 ensures that digital video signal 13 is encoded in the selected video format via well-known methods and techniques, and transmits digital video signal 13 to display device 25 via digital interface 15.

If, after reading and processing EDID Data Structure 75 as shown in the examples of FIGS. 3–9, it is determined that values for one or more timing parameters within a particular video format are not within the expected predetermined value ranges, then it may be inferred that the EDID Data Structure contained incorrect information, or the particular video format is not supported by the display device. If it is determined that a particular format listed in the EDID Data Structure is not in fact supported by the display device, or if no identifiable formats are listed in the EDID Data Structure (for example, the entire EDID Data Structure was bad—contained corrupt or fictitious information or contained no video formats/timing parameters), then system 10 may allow the user to select any video format supported by system 10, via a format menu accessed using user interface 55.

If it is determined that EDID Data Structure 75 contains incorrect timing parameter information, but that a particular format is in fact supported by the display device (for example, if a predetermined number of, or particular ones of, timing parameters do not fall within expected value ranges, while another predetermined number of, or particular ones of, timing parameters do fall within the expected value ranges), then system 10 may obtain correct timing parameters for a particular video format from another source, and may include the video format on the menu presented to the user, or may reject the incorrect formats, and default to the base format of 720×480p, at an aspect ratio of 4:3, then allow the user to select his desired format from a GUI.

When obtaining correct timing parameters, system 10 may retrieve locally stored timing parameters, from storage medium 64, for example, or may retrieve remotely stored timing parameters—from, for example, one or more locations, such as directories, servers, or dedicated communication channels or data carousels. To retrieve remotely stored timing parameters, system 10 may be configured to search or consult a predetermined list of directories, channels or servers for the existence of correct timing parameters, or correct timing parameters may be "pushed" to system 10 by a remote operator, such as a cable operator. Remote locations or downloads may be accessed or accomplished via external network connection/communication interfaces 59, or via an in-band file download mechanism.

The method illustrated in the flowchart of FIG. 2 may be implemented by any stored instructions, such as software 22. When loaded into a processor, such as processor 39, software 22 would operate to verify video formats supported by a particular display device. As indicated above, however, it will be appreciated that aspects of the present invention are not limited to any specific embodiments of computer software or signal processing methods.

Although a specific architecture has been described herein, including specific functional elements and relationships, it is contemplated that the systems and methods herein may be implemented in a variety of ways. For example, functional elements may be packaged together or individually, or may be implemented by fewer, more or different devices, and may be either integrated within other products, or adapted to work with other products externally. When one element is indicated as being responsive to another element, the elements may be directly or indirectly coupled.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A method (200) for verifying a video format supported by a display device (25), the display device (25) adapted to receive a digital television signal from a digital video source (10) via a digital video interface (15), the method comprising:

receiving (202) a data structure (75) provided by the display device (25), the data structure (75) specifying a plurality of timing parameters associated with a supported video format;

providing (204) a plurality of predetermined value ranges, each of the plurality of predetermined value ranges corresponding to one of the plurality of timing parameters;

separating (206) the received data structure (75) into a plurality of portions, each of the plurality of portions corresponding to one of the plurality of timing parameters;

comparing (208) at least some of the plurality of portions with at least some of the plurality of predetermined value ranges; and based on the comparisons, determining whether the supported video format is verified.

2. A computer-readable medium (64, 70, 50, 71) encoded with a computer program which, when loaded into a processor (39, 77, 50, 71), implements the method of claim 1.

3. The method according to claim 1, further comprising: based on whether the supported video format is verified, including the supported video format in a schedule of supported video formats associated with the display device (25).

4. The method according to claim 3, further comprising: when the supported video format is not verified, not including the supported video format on the schedule.

5. The method according to claim 3, further comprising: when the supported video format is verified, including the supported video format on the schedule.

6. The method according to claim 5, further comprising: based on the comparisons, determining a picture aspect ratio of a verified, supported video format.

7. The method according to claim 5, further comprising: presenting the schedule to a user of the display device for selection of a preferred video format.

8. The method according to claim 7, wherein the schedule is presented to the user as a menu adapted to enable the user to select the preferred video format from the menu.

9. The method according to claim 7, further comprising: based on a selection of the preferred video format by the user, transmitting the digital television signal to the display device in the selected format, via the digital video interface (15).

10. The method according to claim 1, further comprising: storing the data structure in a memory (64).

11. The method according to claim 1, wherein the digital video interface (15) comprises a digital channel.

12. The method according to claim 1, wherein the digital channel comprises an I$^2$C bus.

13. The method according to claim 1, wherein the data structure (75) comprises Video Electronics Standards Association Extended Display Identification Data.

14. The method according to claim 1, wherein the display device (25) comprises one of a high definition television monitor; an extended definition television monitor; and a standard definition television monitor.

15. The method according to claim 1, wherein the video format comprises one of: 1920×1080i; 1280×720p; 720×480p; and 720×480i.

16. The method according to claim 1, wherein the receipt of the data structure (75) occurs upon hot plug connection of the display device to the digital video source (10).

17. The method according to claim 1, wherein the plurality of portions include a predetermined number of bits.

18. The method according to claim 1, wherein the plurality of timing parameters comprise: horizontal active pixels, horizontal blanking pixels, vertical active lines, vertical blanking lines, horizontal sync offset, horizontal sync pulse width, and vertical sync offset.

19. The method according to claim 18, wherein the predetermined value ranges correspond to actual timing parameters obtained by observation of a digital video source transmitting a digital television signal in the supported video format over a digital video interface.

20. An apparatus for verifying a video format supported by a display device (25), comprising:
- a computer-readable storage medium (64); and
- a processor (39) responsive to the computer-readable storage medium (64) and to a software program (22), the software program (22), when loaded into the processor (39), operative to perform a method comprising:
  - receiving a data structure (75) specifying a plurality of timing parameters associated with a supported video format of the display device (25);
  - accessing a plurality of predetermined value ranges, each of the plurality of predetermined value ranges corresponding to one of the plurality of timing parameters;
  - separating the received data structure (75) into a plurality of portions, each of the plurality of portions corresponding to one of the plurality of timing parameters;
  - comparing at least some of the plurality of portions with at least some of the plurality of predetermined value ranges; and
  - based on the comparisons, determining whether the supported video format is verified.

21. The apparatus according to claim 20, wherein the processor is associated with the display device.

22. The apparatus according to claim 20, wherein the processor is associated with a set-top box (10) adapted to transmit a video signal to the display device (25).

23. The apparatus according to claim 20, wherein the processor is associated with a digital video interface (50/71) responsive to the display device (25).

* * * * *